United States Patent
McCarter et al.

(10) Patent No.: US 12,399,692 B2
(45) Date of Patent: Aug. 26, 2025

(54) GENERATING AND PRESENTING TRANSITIVE CLOSURES FOR AN OPERATING SYSTEM

(71) Applicant: Microsoft Technology Licensing, LLC, Redmond, WA (US)

(72) Inventors: Fiona Quigley McCarter, Seattle, WA (US); Annalilia Horstmann Cavazos, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 18/295,140

(22) Filed: Apr. 3, 2023

(65) Prior Publication Data

US 2024/0329954 A1    Oct. 3, 2024

(51) Int. Cl.
*G06F 8/41* (2018.01)

(52) U.S. Cl.
CPC ............ *G06F 8/433* (2013.01); *G06F 8/4435* (2013.01)

(58) Field of Classification Search
CPC ............................... G06F 8/433; G06F 8/4435
See application file for complete search history.

(56) References Cited

U.S. PATENT DOCUMENTS

2004/0255272 A1* 12/2004 Ondrusek ................. G06F 8/71
717/120

FOREIGN PATENT DOCUMENTS

GB    2402777 A  * 12/2004  .............. G06F 8/75

OTHER PUBLICATIONS

Debtree—show relationships between packages, Ubuntu Manpage, 2020, 11 pages, [retrieved on Apr. 15, 2025], Retrieved from the Internet: <URL:https://web.archive.org/web/20200717193809/https://manpages.ubuntu.com/manpages/xenial/man1/debtree.1.html>.*

* cited by examiner

*Primary Examiner* — Geoffrey R St Leger
(74) *Attorney, Agent, or Firm* — Ray Quinney & Nebeker P.C.; James S. Bullough

(57) ABSTRACT

This disclosure relates to determining, presenting, and optimizing an operating system (OS) for use in hosting a set of binaries. An operating system (OS) dependency management system provides features and functionality for analyzing dependencies within an OS with respect to one or more binaries to determine transitive closures representative of branches of dependencies within the OS and optimizing one or more components of the OS for the binaries in a way that reduces or otherwise removes the unnecessary code from the OS while enabling the binaries to be hosted. In addition to this analysis and optimization, the systems described herein further involve providing a presentation of an optimized version of the OS (or select OS components) in a way that enables a user to navigate dependencies within the OS associated with hosting a given set of binaries.

20 Claims, 9 Drawing Sheets

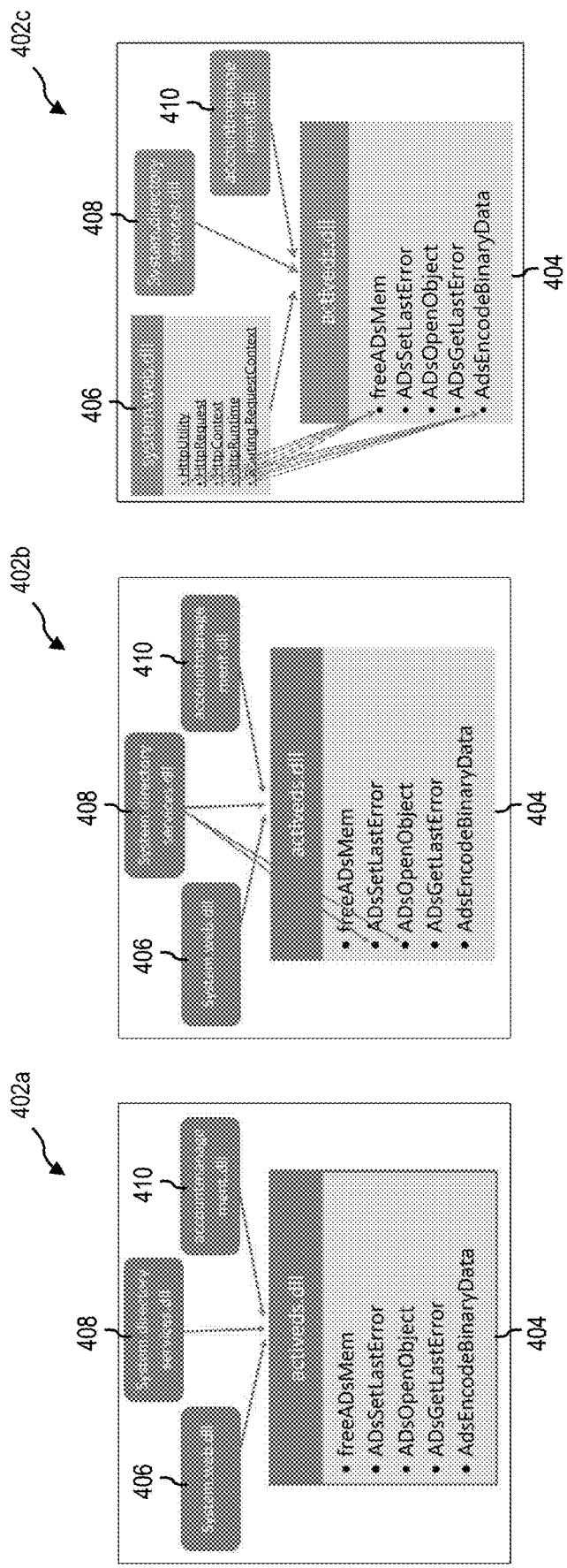

GENERATING AND PRESENTING TRANSITIVE CLOSURES FOR AN OPERATING SYSTEM

BACKGROUND

Recent years have seen a rise in the variety and complexity of computing devices and applications running thereon. As computing devices have become more ubiquitous, operating systems have also increased in size and complexity to accommodate the ever-increasing number of applications and packages of code that are hosted by various operations systems. As an example, cloud-based operating systems provide a robust framework that enables a variety of software packages and application suites having a large number of binaries and code packages to be hosted thereon.

As these operating systems have grown in size and complexity, and as the code hosted thereon has been updated and added onto, these operating systems have become larger in size resulting in a significant expense of processing and storage resources in order to accommodate an ever-increasing quantity of projects. In addition, as applications are modified, removed, and/or updated, operating systems that host these applications often end up with a significant amount of unused code (e.g., dead code) and invalid dependencies. These unused portions of the operating systems represent significant processing and storage resources and, in some cases, expose vulnerabilities to user and system data in the form of application programming interfaces (APIs) that are not necessary for the function of various applications.

These and other problems exist in connection with hosting and executing binaries on modern operating systems.

BRIEF DESCRIPTION OF THE DRAWINGS

FIGS. 4A-4C illustrate example presentations of binary icons and associated dependencies in accordance with one or more embodiments.

DETAILED DESCRIPTION

Figure 1:
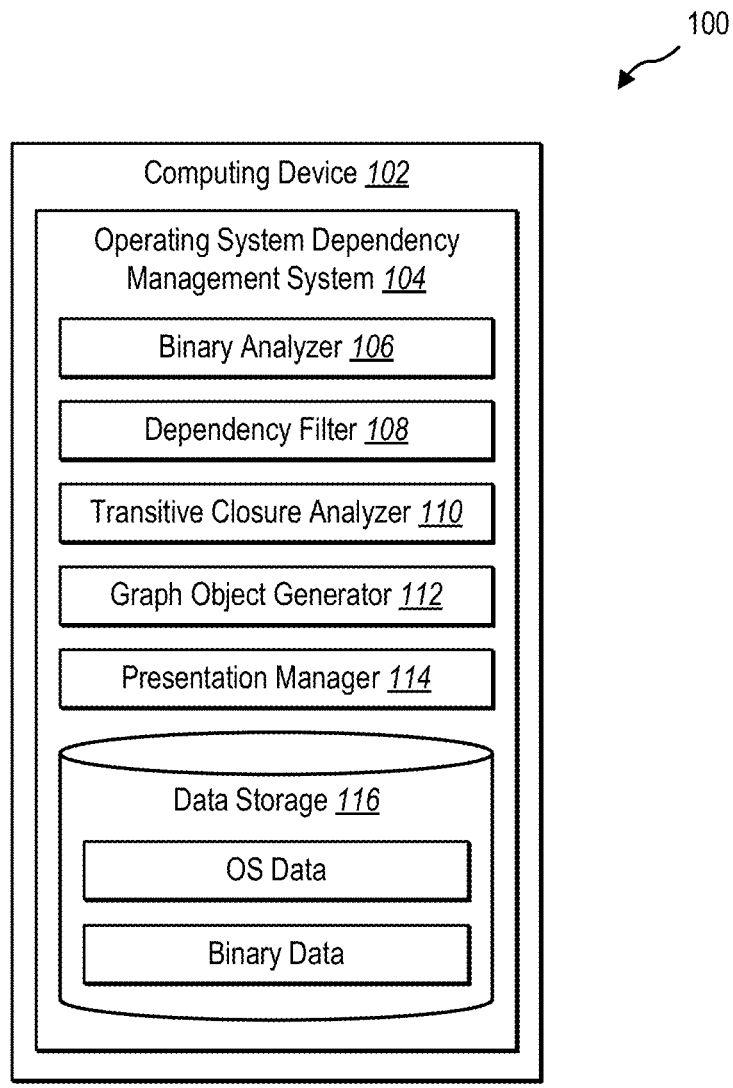
FIG. 1 illustrates an example environment in which an operating system dependency management system is implemented on a computing device in accordance with one or more embodiments.

The present disclosure relates to methods, systems, and computer-readable media for determining, presenting, and optimizing use of dependencies in an operating system. The present disclosure relates to an operating system (OS) dependency management system having features and functionality for analyzing dependencies within an OS with respect to one or more binaries to determine transitive closures representative of branches of dependencies within the OS and optimizing one or more components of the OS for the binaries in a way that reduces or otherwise removes the unnecessary code from the OS while enabling the binaries to be hosted. In addition to this analysis and optimization, features and functionality described herein further involve providing a presentation of a reduced or otherwise optimized version of the OS (or select OS components) in a way that enables a user to navigate dependencies within the OS associated with hosting a given set of binaries.

As a first illustrative example, an OS dependency management system receives a binary to be hosted by an OS. The OS dependency management system determines first layer dependencies of the binary within the OS by applying a binary analyzer tool to the binary. The OS dependency management system determines a plurality of transitive closures representative of branches of dependencies within the OS where determining the plurality of transitive closures includes iteratively determining, for each first layer dependency of the plurality of first layer dependencies, one or more transitive closures of the plurality of transitive closures. The OS dependency management system additionally generates a transitive closure graph based on the determined plurality of transitive closures, the transitive closure graph including a tree of binaries represented within the plurality of transitive closures.

As a second illustrative example, an OS dependency management system receives a binary to be hosted by a first component of an operating system (OS). The OS dependency management system determines a plurality of first layer dependencies of the binary within the first component of the OS by applying a binary analyzer tool to the binary. The OS dependency management system additionally determines a plurality of transitive closures representative of branches of dependencies within the first component of the OS where determining the plurality of transitive closures includes iteratively determining, for each first layer dependency of the plurality of first layer dependencies, one or more transitive closures of the plurality of transitive closures. The OS dependency management system also adds a list of dependencies represented in the plurality of transitive closures to the first component of the OS. In one or more embodiments, the OS dependency management system further runs a test of the binary on a first optimized version of the first component of the OS in which at least one dependency of the first component of the operating system has been removed based on the at least one dependency not being included within the transitive closure graph.

The present disclosure includes a number of practical applications that provide benefits and/or solve problems associated with analyzing an OS with respect to hosting one or more binaries, determining transitive closures for an optimized or reduced version of the OS, and other tasks related to optimizing and/or presenting a graph representative of the transitive closures of the OS for a given set of one or more binaries. Some non-limiting examples of these applications and benefits are discussed in further detail below.

By identifying dependencies of a binary within an OS, the OS dependency management system facilitates determining select portions of an OS that are necessary for hosting a given binary (or set of binaries). This selective identification of only those dependencies that are needed to host binaries enables the OS dependency management system to optimize an OS by removing code that is not necessary for hosting the binary.

Removing unnecessary code from an OS in accordance with one or more embodiments provides a number of non-trivial benefits to the cloud, device, or set of devices that provide the OS platform. For example, by reducing a quantity of OS code, the OS dependency management system more efficiently utilizes computing and storage resources and, as a result, reduces a quantity of storage and computing resources necessary to host the binaries. In addition, by reducing unnecessary code, the OS dependency management system reduces the area of attack and various vulnerabilities, such as APIs that represent possible points of attack for unauthorized access to system and user data.

As noted above, the OS dependency management system facilitates determining a plurality of transitive closures representative of branches of dependencies that are needed when hosting a binary (or set of binaries). This structure of dependencies provides a comprehensive picture of dependencies while enabling an individual, such as a developer, administrative user, or other entity to identify or navigate portions of transitive closures that are weakly connected or that represent redundant components within the OS. As will be discussed below, the OS dependency management system applies various criteria when analyzing the transitive closures to determine which branches are weakly connected to the topology of dependencies and/or determine certain components of the OS that are redundant to a given binary. This selective identification of the transitive closures based on various criteria provides further opportunities for reduction and other optimizations of the OS when hosting a given set of binaries.

In addition to providing optimization opportunities, by generating and presenting a transitive closure graph based on the transitive closures, the OS dependency management system provides a tool that enables a developer, administrator, or other entity to navigate a complex set of dependencies and gain insights on how certain APIs and/or binaries interact with one another. Indeed, as will be discussed in further detail below, the OS dependency management system provides a presentation of interactive icons representative of binaries and/or respective APIs to view specific dependencies within the transitive closures.

Various acts performed by the OS dependency management system can additionally be performed in an iterative manner to incrementally optimize portions of an OS for a given project or binary. For example, the OS dependency management system can run tools described herein (e.g., a binary analyzer and transitive closure analyzer tools) for a given component or portion of an OS (e.g., a sub-portion of a more robust OS) to determine an optimized list of dependencies particular to the OS component(s). The OS dependency management system similarly runs the tools described herein for each of multiple portions of an OS and combine the output listing of dependencies to generate a more comprehensive list of dependencies based on multiple pluralities of transitive closures that are generated for respective portions of the OS. This enables the OS dependency management system to incrementally optimize an OS over time and without overwhelming currently available computing resources, particularly where an OS is a complex or large OS, such as an OS that is hosted across multiple devices of a cloud computing system.

As illustrated in the foregoing discussion, the present disclosure utilizes a variety of terms to describe features and advantages of the systems described herein. Additional detail is now provided regarding the meaning of some example terms.

As used herein, in an example, an "operating system" or "OS" refers to a software program or platform that manages access to hardware and other computing resources to any number of binaries that are hosted by or executing in connection with the operating system. In one or more embodiments described herein, an OS manages dependencies between binaries (e.g., between APIs of respective binaries) and other software components to enable programs or applications to reference other binaries or other software components and ultimately perform a wide variety of functions and tasks.

As used herein, in an example, a "binary" refers to a portion of code or other data object that can be executed using an OS. In one or more embodiments, a binary includes package code having references or dependencies to other binaries (e.g., external binaries) that are configured to perform various tasks or that provide further functionality. A binary references other binaries, which are referred to herein as external binaries. As discussed in one or more examples herein, external binaries refer to binaries that are referenced by a particular binary. (e.g., when referring to binaries that are referenced by a particular binary).

As used herein, in an example, a "project" refers to a package of one or multiple binaries that include code or instructions for performing a variety of tasks of functions. A project includes one or multiple applications (e.g., an application suite) that are hosted by an OS. While one or more embodiments described herein refer specifically to analyzing a particular binary, features described herein in connection with analyzing, optimizing, and visualizing dependencies for a binary similarly apply to performing similar functions with respect to one or more projects.

As used herein, in an example, a "dependency" refers to components of an OS referenced by one or more binaries. Examples of dependencies include other binaries (e.g., external binaries), libraries, hardware drivers, and other components of the OS (or external to the OS) that can be referenced by a particular binary. In one or more embodiments described herein, dependencies refer to APIs that a binary calls when executing code of the binary.

In one or more embodiments described herein, dependencies of a binary are represented as one or more transitive closures. As used herein, in an example, a "transitive closure" refers to a branch of dependencies for a particular binary or set of binaries. As will be discussed herein, a binary is associated with any number of transitive closures that represent a set of branches including dependencies that are needed to host a given binary or set of binaries. In one or more embodiments, the transitive closure includes dependencies between APIs of different binaries.

As used herein, in an example, a "transitive closure graph" refers to a representation of a set of transitive closures for a given binary or set of binaries (e.g., a project). In one or more embodiments described herein, a transitive closure graph is a directed graph markup language (DGML) file for use in visualizing a graph or tree of branches representative of a plurality of transitive closures that are determined for a given binary (or multiple binaries). Further detail in connection with example transitive closure graphs will be discussed below.

Additional detail will now be provided regarding systems described herein in relation to illustrative figures portraying example implementations. For example, FIG. 1 illustrates an example environment 100 including one or more computing device(s) 102 having an operating system (OS) dependency management system 104 (or simply "OS dependency management system 104") thereon. In one or more implementations, the OS dependency management system 104 performs any of the acts described herein in connection with analyzing binaries, determining transitive closures representative of dependencies between binaries of an OS, testing an optimized version of the OS, and providing a presentation of a transitive closure graph in accordance with one or more embodiments.

As shown in FIG. 1, the OS dependency management system 104 includes a plurality of components associated with performing one or more of the features described herein. For example, the OS dependency management system 104 includes a binary analyzer 106, a dependency filter 108, a transitive closure analyzer 110, a graph object generator 112, and a presentation manager 114. The OS dependency management system 104 additionally includes a data storage 116 having OS data, binary data, and other information accessible to components of the OS dependency management system 104.

While FIG. 1 illustrates an example in which the components 106-116 of the OS dependency management system 104 are implemented in a single computing device 102, other implementations involve one or more of the components 106-116 or any of the discrete features and functionalities associated therewith being implemented across multiple computing devices. To illustrate, in one or more embodiments, the binary analyzer 106 and/or transitive closure analyzer 110 are implemented as separate tools or analysis engines on separate devices as other components of the OS dependency management system 104. As another example, in some implementations, the presentation manager 114 is implemented as a separate system from the other components.

The computing device(s) 102 can refer to a variety of devices capable of operation in a variety of computing environments. For example, in one or more embodiments, the computing device(s) 102 includes a mobile device, such as a mobile telephone, a smart phone, a personal digital assistant (PDA), a tablet, or a laptop. Additionally, or alternatively, in one or more implementations, the computing device(s) 102 includes one or more non-mobile devices such as a desktop computer, server device, or other non-portable device. In one or more embodiments described herein, the computing device(s) 102 is referred to as a developer device (or developer machine) based on a user of the computing device(s) 102 developing and/or optimizing an operating system to be deployed on one or more computing devices. The computing device(s) 102 and other described discussed herein may include features and functionality described below in connection with FIG. 8.

In one or more embodiments, the computing device(s) 102 refers to one or more server devices configured to host services that provide any of the features of the OS dependency management system 104 described herein. For example, in one or more implementations, the OS dependency management system 104 refers to a cloud-based service or application(s) that provides features and functionality that enable a developer to utilize resources of a cloud computing system to build an OS, optimize the OS and/or deploy an optimized version of the OS in connection with hosting one or more binaries. Thus, while one or more embodiments described herein refer specifically to a computing device having the OS dependency management system 104 implemented thereon, it will be appreciated that features described in connection with the OS dependency management system 104 on a single computing device may refer to implementations of the OS dependency management system 104 in which the sub-components 106-116 are distributed across multiple devices and computing environments.

As mentioned above, and as will be discussed in further detail below, the OS dependency management system 104 includes a binary analyzer 106. In one or more embodiments, the binary analyzer 106 refers to a tool that is configured to analyze an input binary and determine a list of first layer dependencies of the input binary (or multiple input binaries) within an OS. For example, in one or more embodiments, the binary analyzer 106 identifies a set of external binaries that are referenced or called by the input binary. In one or more embodiments, the binary analyzer 106 only identifies a first layer of dependencies even where the identified dependencies (e.g., external binaries) also have dependencies that reference other external binaries.

As further mentioned above, the OS dependency management system 104 includes a dependency filter 108. Upon identifying the first layer of dependencies for a given binary, the dependency filter 108 determines a filtered set of the first layer dependencies by removing one or more of the dependencies that are known to be unimportant or unnecessary for hosting the input binary. For instance, the dependency filter 108 removes one or more false positives, such as binaries indicated by the dependencies that are known to be unhosted by the OS.

As further shown in FIG. 1, the OS dependency management system 104 includes a transitive closure analyzer 110. The list of first layer dependencies (e.g., the filtered list including a subset of dependencies output by the binary analyzer 106) are passed as inputs to the transitive closure analyzer 110. Upon receiving the first layer dependencies, the transitive closure analyzer 110 determines a plurality of transitive closures for the first layer dependencies associated with the input binary. As noted above, transitive closures refer to branches of dependencies that are related to the input binary and based on analysis of the determined first layer of dependencies. As will be discussed in further detail below, the transitive closure analyzer 110 performs an iterative analysis of the first layer of dependencies to determine a plurality of transitive closures that provide a comprehensive presentation of dependencies within the OS that a binary would potentially use when hosted by the OS.

As further shown in FIG. 1, the OS dependency management system 104 includes a graph object generator 112. The graph object generator 112 receives the transitive closures, perform some additional analysis, and generate an object that includes a plurality of dependencies represented within the plurality of transitive closures. In one or more embodiments, the graph object generator 112 generates a list of dependencies as included within the transitive closures. In one or more embodiments, the graph object generator 112 performs some reorganizing of the dependencies to create a tree showing a topology or hierarchy of the dependencies within the plurality of transitive closures. In one or more embodiments, the graph object generator 112 further removes one or more of the dependencies or branches that are redundant or determines to be a weak branch that should not be included in a listing of dependencies that would fit within an optimized or reduced version of the OS when hosting the input binary (or multiple input binaries).

In one or more embodiments, the graph object generator 112 generates an object that is visually represented via a graphical user interface of a client device. For example, in one or more embodiments, the graph object generator 112 generates a DGML file based on the plurality of transitive closures in which the binaries, dependencies, and other information contained within the plurality of transitive closures are represented as a set of nodes and edges within a graphical object.

As further mentioned above, the OS dependency management system 104 includes a presentation manager 114. The presentation manager 114 receives the object generated by the graph object generator 112 and provide a presentation of the dependencies represented by the plurality of transitive closures. The presentation includes a displayed topology or tree of dependencies (e.g., a dependency tree or tree of binaries). In one or more embodiments, the presentation is an interactive presentation that enables a developer, administrator, or other individual (e.g., user of a computing device on which the presentation is displayed) to navigate between binaries and view the respective branches showing dependencies between various binaries. Additional information in connection with example presentation features will be discussed below.

FIG. 1 also shows a data storage 116 including a variety of data accessible to the other components 106-114 of the OS dependency management system 104. For example, the data storage 116 includes OS data. The OS data includes any information associated with one or more components of an OS. For example, the OS data includes a framework of dependencies indicating paths connecting any number of binaries of the OS.

As further shown, the data storage 116 includes binary data. In one or more embodiments, the binary data includes any information about any number of binaries accessible to a program that runs on a given OS (e.g., on one or more OS components). In one or more embodiments, the binary data refers to any information contained within binaries that are input to the OS dependency management system 104 to determine an optimized OS (or OS component) for hosting the binaries. In one or more embodiments, the binary data refers to information about external binaries on or off the OS that are referenced or whose resources are accessible by an input binary.

Figure 2:
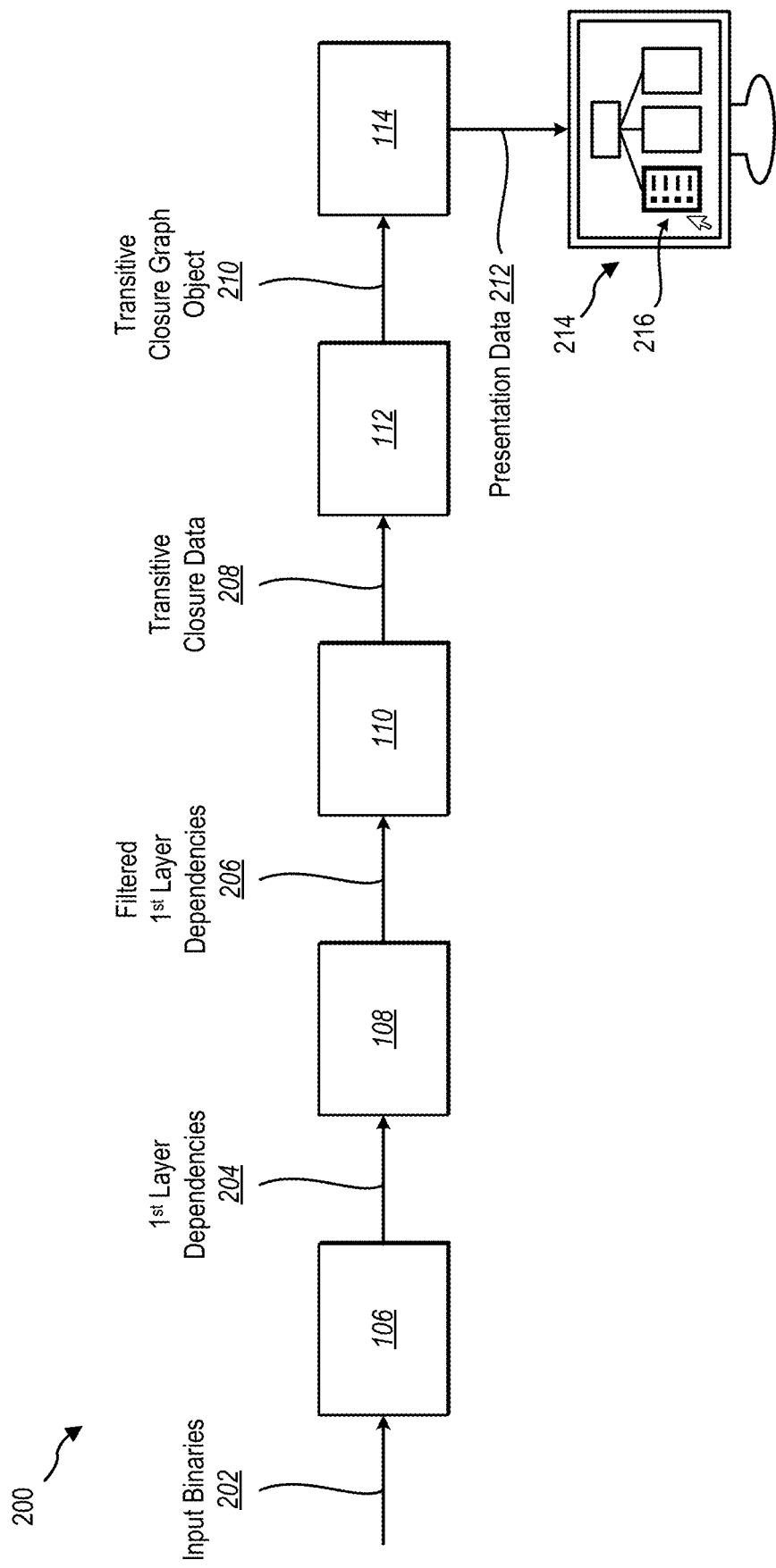
FIG. 2 illustrates an example workflow for generating an optimized version of an operating system for hosting a binary in accordance with one or more embodiments.

Additional information will now be discussed in connection with an example workflow 200 showing an implementation of the OS dependency management system 104 in generating a dependency graph object in accordance with one or more embodiments. In particular, FIG. 2 illustrates an example workflow showing a process in which the OS dependency management system 104 determines dependencies for one or more input binaries and generates a data object including a tree or graph or other structure of transitive closures. In accordance with one or more examples herein, the generated plurality of transitive closures is representative of the resources of a given OS or OS component on which a given set of input binaries depends. Each of the components shown in FIG. 2 have similar features and functionalities as similar components discussed above in connection with FIG. 1.

As shown in FIG. 2, input binaries 202 (e.g., one or multiple binaries, such as a project or set of binaries that are used by a particular application) are provided as inputs to a binary analyzer 106. As discussed above, the binary analyzer 106 analyzes code of the input binaries 202 to determine and output a first layer of dependencies 204. The first layer of dependencies 204 refers to a first layer of code or a first layer of external binaries on which the input binaries 202 depend. In one or more embodiments, the binary analyzer 106 runs an analyzer tool on the input binaries 202 and generates a list of all binaries that are referenced or specifically indicated within the input binaries 202. It will be appreciated that the first layer dependencies 204 refers to those dependencies referenced or identifiable directly from the input binaries 202 and do not include additional dependencies to the first-level dependencies that are not referenced or identifiable directly from the input binaries 202.

In one or more embodiments, these first-level dependencies refer to external binaries (e.g., binaries outside of the respective input binaries) that are hosted by the OS. Thus, in addition to generally identifying dependencies of the input binaries 202, the binary analyzer 106 refers to an analyzer tool that is run on the input binaries 202 against the OS (or specific OS component) to identify and output a hosting status of the identified dependencies. Indeed, the output of the binary analyzer 106 may include a listing of first layer dependencies 204 and a hosting status for each of identified dependencies.

As shown in FIG. 2, the first layer of binaries 204 is provided to a dependency filter 108. The dependency filter 108 identifies filtered first layer dependencies 206 based on various criteria. For example, the dependency filter 108 determines a subset of the first level dependencies 204 that are hosted by the relevant OS or OS component. In one or more embodiments, the dependency filter 108 filters the first layer of dependencies 204 by identifying any false positives (e.g., unhosted external binaries) from the first layer of dependencies 204. In short, the dependency filter 108 may output a subset of dependencies including some, but not all, of the first layer dependencies 204.

It will be appreciated that while the binary analyzer 106 and dependency filter 108 are shown as separate components, these components may be incorporated within an common analysis tool. For example, in one or more embodiments, the dependency filter 108 is implemented as a feature of an external binary analyzer. In other examples, the binary analyzer 106 outputs the first layer of dependencies, and the dependency filter 108 being implemented on a different analyzer tool performs that act of determining the filtered first layer dependencies 206, as shown in FIG. 2.

As shown in FIG. 2, upon determining the filtered first layer dependencies 206, the dependency filter 108 provides the filtered first layer dependencies 206 for further processing to the transitive closure analyzer 110. In one or more embodiments, the transitive closure analyzer 110 receives the dependencies and determine a plurality of transitive closures.

The transitive closure analyzer 110 determines the plurality of transitive closures using an iterative process. For example, in one or more embodiments, the transitive closure analyzer 110 builds one transitive closure branch at a time by going through the listing of dependencies one binary or dependency at a time. For instance, the transitive closure analyzer 110 can identify a first dependency within a binary and determine any number of dependencies branching from the first dependency. The transitive closure analyzer 110 can similarly analyze each of those dependencies until the branches of dependencies are completely and accurately determines for each of the filtered first layer dependencies 206.

It will be noted that the binary analyzer 106 and transitive closure analyzer 110 may be performed by different analyzer tools that are capable of performing different non-overlapping tasks. For instance, in one or more embodiments, the binary analyzer 106 is configured to identify first layer dependencies that are a first layer of resources in native code to the OS. These first layer dependencies are identified from the code of the input binaries. In contrast, the transitive closure analyzer 110 may be incapable or not configured to recognize first layer dependencies as the first layer dependencies refer to resources as native code. However, once identified and provided to the transitive closure analyzer 110, the transitive closure analyzer 110 can be configured to identify branches of dependencies within the OS and generating the transitive closure data 208 representative of all the branches of dependencies that depend from the first layer dependencies corresponding to the input binaries 202.

The transitive closure data 208 may include a variety of information and other useful data identified by the transitive closure analyzer 110. For example, in one or more embodiments, the transitive closure data including a listing of binaries, dependencies, and other components that make up a structure of a set of transitive closures (e.g., a tree or other hierarchical structure of transitive closure branches). In one or more embodiments, the transitive closure data includes APIs associated with respective binaries. In one or more embodiments, the transitive closure data further includes links or branches between the specific APIs (e.g., in addition to dependencies between binaries generally).

As shown in FIG. 2, the transitive closure analyzer 110 provides transitive closure data 208 to the graph object generator 112 for further processing. The graph object generator 112 identifies and analyzes characteristics of the resulting plurality of transitive closures. For instance, in one or more embodiments, the graph object generator 112 identifies or analyzes various characteristics of the tree or structure of branches to determine whether certain external binaries, dependencies, or branches of dependencies have particular interest to a user (e.g., a developer, network administrator).

In one or more embodiments, the graph object generator 112 analyzes characteristics of certain branches from the plurality of transitive closures to determine whether one or more of the branches are weakly connected to the remaining portions of the transitive closure structure. For example, where a certain dependency or external binary is connected to the structure of the transitive closure via a single dependency (or less than some minimum threshold number of dependencies), the graph object generator 112 tags that particular branch or transitive closure as a weakly connected branch. In one or more embodiments, this involves tagging a portion of the transitive closure data object with metadata indicating the weakly connected branch. In one or more embodiments, the graph object generator 112 includes the indication of the weakly connected branch via a table or listing of dependencies output by the graph object generator 112.

As another example, in one or more embodiments, the graph object generator 112 analyzes certain branches or sets of branches to determine whether one or more transitive closures are similar or identical to other transitive closures. In the event that two or more transitive closures share a threshold number of similar characteristics (e.g., a similar collection of APIs, similar groupings of dependencies, similar listings of binaries), the graph object generator 112 tags metadata of that particular branch or transitive closure as substantially similar to another branch or transitive closure within the structure of transitive closures. This may involve tagging one or more of the similar portions with metadata indicating the similar or identical nature of the transitive closures. In one or more embodiments, the graph object generator 112 includes the indication of the similar or identical branches via a table or listing of dependencies output by the graph object generator 112.

In one or more embodiments, the graph object generator 112 generates a transitive closure graph object 210 based on the received transitive closure data 208 and additional processing performed by the graph object generator 112. In one or more embodiments, the graph object generator 112 generates a transitive closure graph object 210 including a listing of binaries and dependencies to be added to the OS (or component of the OS) for testing or for execution of the OS. In one or more embodiments, the transitive closure graph object 210 is used in generating an optimized OS or, in some cases, for optimizing an existing OS (e.g., by removing binaries or code that are not indicated within the transitive closure graph object 210).

In one or more embodiments, the transitive closure graph object 210 is used in presenting a visualization of the transitive closure data 208. For example, in one or more embodiments, the transitive closure graph object 210 is a DGML file (or other graphical object type of file) to be provided to a presentation tool (e.g., the presentation manager 114) for further processing and for providing a display or visualization of the plurality of transitive closures. Additional detail in connection with presenting the transitive closure graph object 210 will be discussed below in connection with FIGS. 3A-3B.

In the example shown in FIG. 2, the transitive closure graph object 210 is provided to a presentation manager 114. The presentation manager 114 then provides the presentation data 212 to a computing device 214 having a graphical user interface 216 thereon. As shown in FIG. 2, the computing device 214 receives presentation data 212 and presents a display of the presentation data 212 via a graphical user interface 216 on the computing device 214. In one or more embodiments, the presentation data 212 is provide to the computing device 214 for generating the presentation thereon. Alternatively, in some embodiments, the presentation is generated remotely (e.g., on a cloud computing service) and presented via the graphical user interface 216 using an web application, such as a web browser.

Figure 3A:
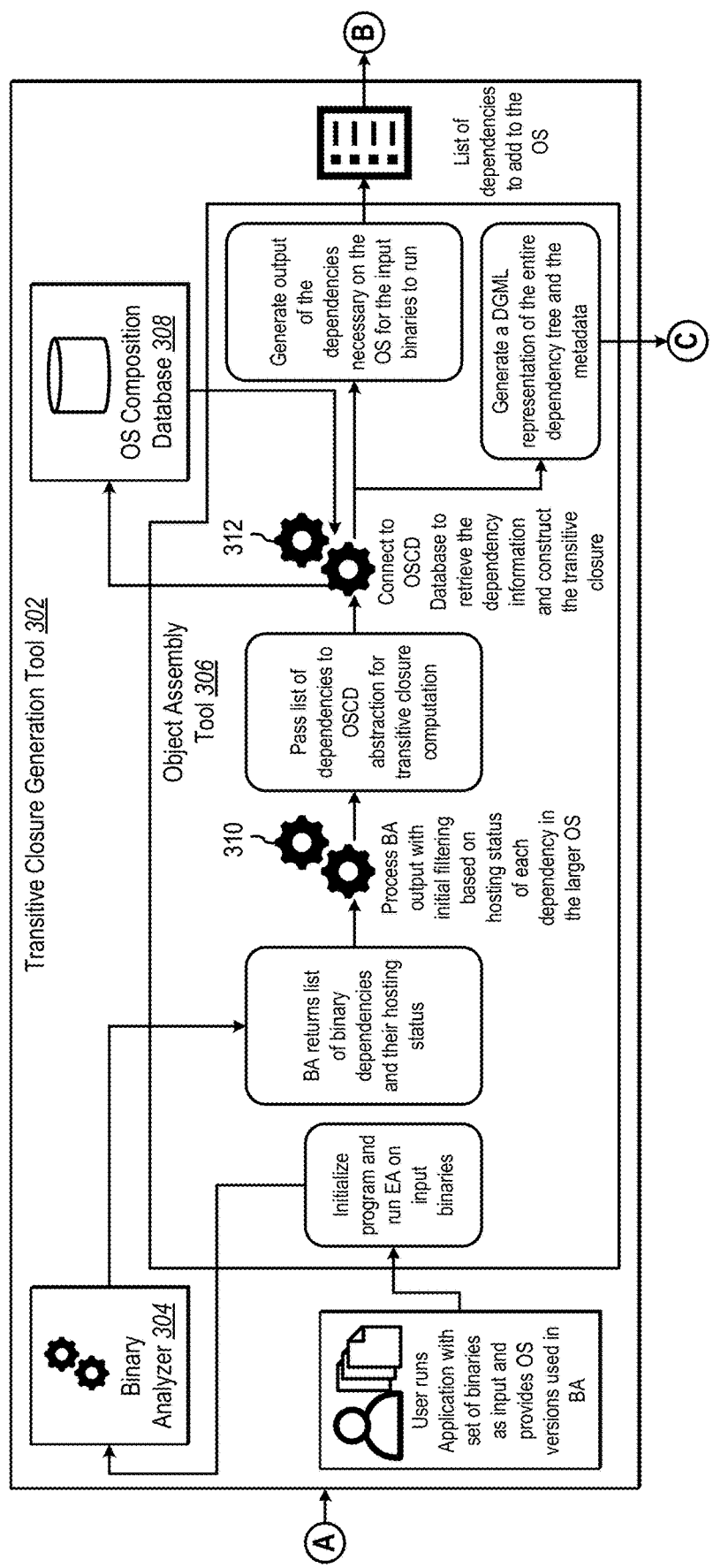
FIGS. 3A-3B illustrate a more detailed implementation of the dependency management system and a graph presentation tool in accordance with one or more embodiments.
Figure 3B:
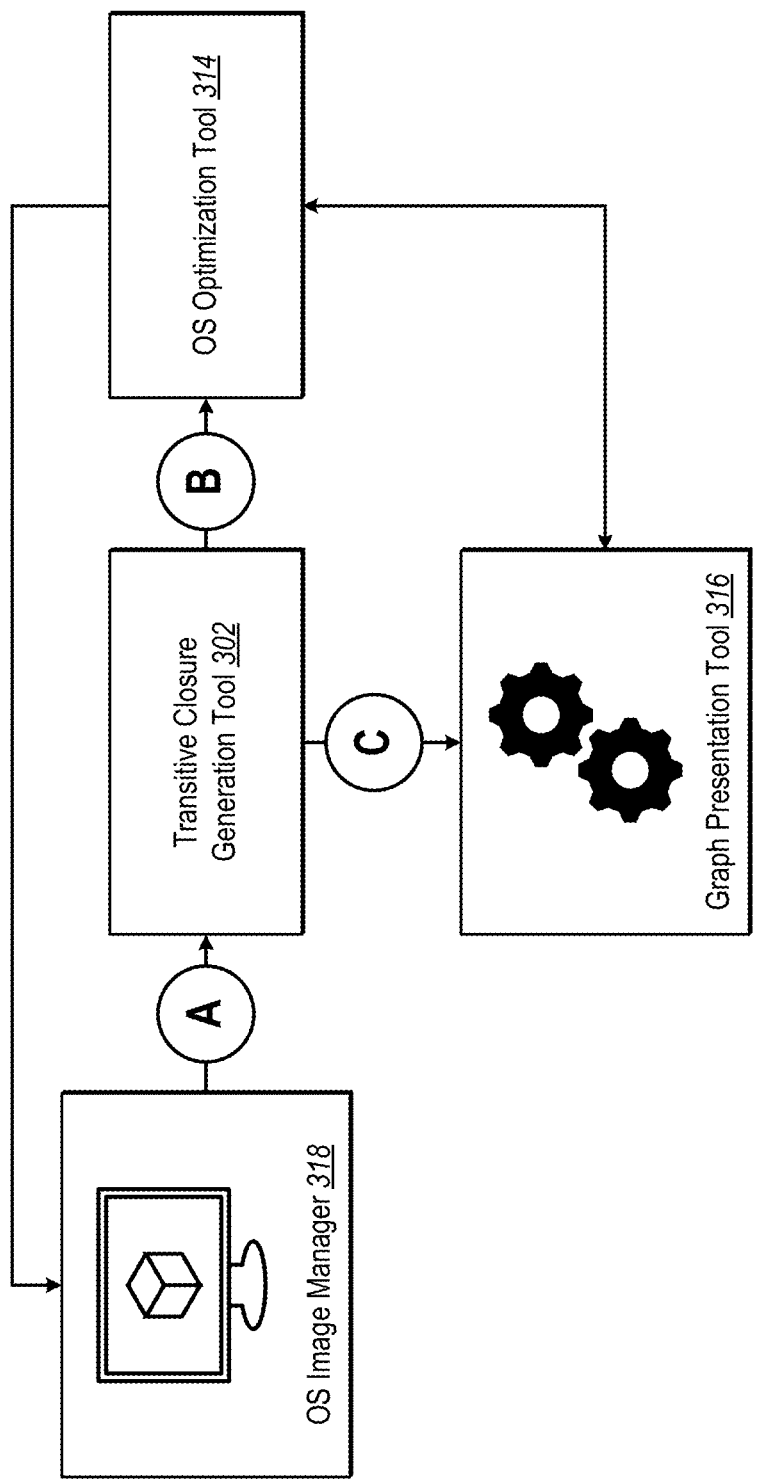

FIGS. 3A-3B illustrate a more detailed example implementation of the OS dependency management system 104. In particular, FIGS. 3A-3B illustrate an example workflow implemented within an example environment of tools (e.g., software tools). As discussed above, and as will be discussed in further detail below, these tools are used to analyze binaries and determine a set of dependencies that are used or relied on by a particular set of binaries. This set of dependencies are present for insight and, in some instances, can be used for testing an OS or optimizing an OS by removing code that is not needed for hosting a particular program or set of binaries.

It will be understood that FIGS. 3A-3B illustrate an example environment of tools in accordance with one or more embodiments. In some examples, a binary analysis tool, an object assembly tool, an OS composition database, and presentation tool(s) are provided by different software tools on different devices and/or different platforms. Nevertheless, one or more features described in connection with the respective tools or platforms may be combined within any of the other illustrated platforms or, in some cases, be performed by separate software tools altogether.

FIG. 3A illustrates an example transitive closure generation tool 302 in accordance with one or more embodiments. As shown in FIG. 3A, the transitive closure generation tool 302 includes a binary analyzer 304, an object assembly tool 306, and an OS composition database 308 (e.g., an OS composition database tool). Each of these tools may cooperatively perform acts related to analyzing input binaries to determine first layer dependencies, filtering the first later dependencies, generating transitive closures and creating one or more graph objects in accordance with one or more embodiments.

As shown in FIG. 3A, the object assembly tool 306 receives input binaries (e.g., code to run on an OS). The input binaries are received from a variety of sources denoted by "A", and which will be discussed in further detail below. In one or more embodiments, a user provides the input binaries by running an application with a set of binaries as input and providing OS versions (e.g., a version of an OS or specific OS component(s)) to the object assembly tool 306. In one or more embodiments, the object assembly tool 306 receives the input binaries and runs a preliminary analysis to determine a baseline of initial false positives.

The set of binaries (and baseline of false positives) is provided as input to the binary analyzer 304. For example, as shown in FIG. 3A, the object assembly tool 306 initializes the program (including the binaries) and runs the binary analyzer on the binaries. As shown in FIG. 3A, and as discussed above, the binary analyzer 304 returns a list of binary dependencies (e.g., first layer dependencies) and associated hosting status. In one or more embodiments, the list of first layer dependencies includes a table of the identified first layer dependencies and associated hosting status on the OS.

As shown in FIG. 3A, the list of binaries dependences is provided as inputs to a filtering tool 310. The filtering tool 310 is an example of the dependency filter 108 discussed above. As shown in FIG. 3A, the filtering tool 310 processes the listing of dependencies output by the binary analyzer 304 based on hosting status of each dependency in the OS. The filtering tool 310 passes the list of dependencies for transitive closure computation. In one or more embodiments, the filtering tool 310 provides the list of dependencies to an object graph generation tool 312 and/or an OS composition database 308 for further processing.

In the illustrated example, the object graph generation tool 312 and the OS composition database 308 cooperatively determine transitive closures and generate a graph object representative of the transitive closures. The object graph generation tool 312 refers to an example implementation of the graph object generator 112 while the OS composition database 308 refers to an example implementation of the transitive closure analyzer 110.

As shown in FIG. 3A, the object graph generation tool 312 connects to the OS composition database 308 to retrieve dependency information for use in constructing the transitive closure. In particular, the object graph generation tool 312 and the OS composition database 308 iteratively computes a transitive closure for each of the first layer dependencies. The object graph generation tool 312 iteratively constructs a structure of transitive closures representative of chains of dependencies for each of the first-layer dependencies provided by the filtering tool 310.

In constructing the transitive closures, the object graph generation tool 312 and the OS composition database 308 walks down each path of dependencies for each first layer dependency until a comprehensive structure of transitive closures is constructed for the input binaries. By iteratively walking down each path, the object graph generation tool 312 and the OS composition database 308 iteratively generate a resulting graph object (e.g., a DGML file or a listing of dependencies) as the tools run through each branch. By iteratively generating the transitive closure graphs and resulting graph object, the object graph generation tool 312 is able to group the branches and/or certain dependencies in an efficient and helpful manner. For example, in one or more embodiments, the object graph generation tool 312 groups transitive closures by associated types of code. The object graph generation tool 312 also groups the code and/or format the code in a way that lends to a hierarchical graph that is navigable using a presentation tool. This grouping of the transitive closure data is made possible by the iterative nature of calculating the transitive closure branches one dependency layer at a time.

As noted above, the graph object may refer to one of a variety of objects. In the example shown in FIG. 3A, the object graph generation tool 312 generates an output of the dependencies necessary on the OS for the input binaries to run. This is output as a listing of dependencies to be added to the OS. This listing of dependencies are provided to an OS optimization tool, denoted as "B", and which will be discussed in further detail below. In addition, or as an alternative, the object graph generation tool 312 generates a DGML representation of the entire dependency tree and associated metadata for use in creating a visualization of the transitive closures. The DGML representation is provided to a graph presentation tool, denoted as "C", and which will be discussed in further detail below.

FIG. 3B shows an example of interactions between the transitive closure generation tool 302 and additional tools within the framework of the OS dependency management system 104. As indicated above, the transitive closure generation tool 302 interacts with an OS image manager 318, denoted above as source "A". In this example, the OS image manager 318 provides any information associated with an operating system and input binaries that are provided as input to the transitive closure generation tool 302. In this example, the transitive closure generation tool 302 receives a specified service to be hosted by an OS, which involves receiving a set of binaries and pass-through tools to get the dependencies required to run.

As discussed above, and as shown in FIG. 3B, the transitive closure generation tool 302 communicates with an OS optimization tool 314, denoted above as "B". The OS optimization tool 314 provides a variety of features and functions related to testing and/or optimizing an OS having the identified list of dependencies from the tree of transitive closures generated by the transitive closure generation tool 302. Indeed, in one or more embodiments, the OS optimization tool 314 receives the listing of dependencies, adds the listing of dependencies to a new or existing OS (or OS component), and runs a test of the OS to determine whether the input binaries can be effectively hosted by an optimized version of the OS.

As shown in FIG. 3B, and as denoted above as "C", the transitive closure generation tool 302 interacts with a graph presentation tool 316 in providing a visualization of the graph object generated by the transitive closure generation tool 302. As shown in FIG. 3B, the transitive closure generation tool 302 provides the DGML file to the graph presentation tool 316. The graph presentation tool 316 loads the graph object. Based on used inputs, the graph presentation tool 316 computes a sub-graph including a select portion of the graph object showing dependencies between binaries and/or APIs. The graph presentation tool 316 further provides a presentation or display of the select portion of the graph object. Additional information in connection with example presentation features will be discussed below in connection with FIGS. 4A-4C and FIGS. 5A-5B.

In addition to loading the graph object and providing a presentation representative of one or more transitive closures that make up the graph object, the graph presentation tool 316 can interact with the OS optimization tool 314 in a variety of ways. For example, in addition to providing a presentation of a portion of the graph object, the graph presentation tool 316 receives inputs interacting with certain portions of the graph object and, in some cases, indicates portions of the graph object that can be further optimized.

As an example, as noted above, one or more embodiments of the DGML file include metadata indicating certain branches of the graph object being weakly connected with other portions of the graph object. In this example, the graph presentation tool 316 provides an indication of the weak branches and further enables a user to remove certain binaries and/or APIs from the graph object based on a user determination that the input binaries can be hosted without the code of the weakly connected branch.

As another example, as noted above, the DGML file includes metadata indicating certain transitive closures or branches that are identical or very similar to other branches within the graph object. In this example, the graph presentation tool 316 provides an indication of the similar or identical branches an enable a user to remove one or more of the identical branches based on a user determination that the input binaries can be hosted within the redundant code of the similar or identical branches.

In each of these examples, after allowing a user to remove certain portions of the plurality of transitive closures, the transitive closure generation tool 302 and/or OS optimization tool 314 can update the listing of dependencies and further test the OS and determine whether the reduced or otherwise optimized version of the OS can effectively host the input binaries. In this way, the graph presentation tool 316 and the OS optimization tool 314 cooperatively enable a user to further optimize the OS components based on a combination of the optimized list that is output by the transitive closure generation tool 302 in addition to further input provided by a user that has domain knowledge related to the OS.

As shown in FIG. 3B, the OS optimization tool 314 provides information to the OS image manager 318 for updating the OS in accordance with testing data and/or further optimization that is performed with respect to the OS. In one or more embodiments, this data is used to construct an OS that is optimized for a particular set of input binaries. In one or more embodiments, this data is used to optimize an existing OS for a particular set of input binaries.

In one or more embodiments, the workflows described herein are performed in an iterative manner with respect to multiple OS components. For example, the process of generating and optimizing a listing of dependencies is performed with respect to a first OS component. After optimizing this first OS component, a similar process of generating and optimizing a listing of dependencies is performed for a second OS component (And so forth). Each of these components refer to respective components of a more robust or comprehensive OS. By iteratively optimizing or otherwise refining components of a larger OS, the features of the OS dependency management system 104 can be performed in manageable quantities that allows for iterative optimization of an OS. This is often preferable to optimizing an entire OS, which can be a computationally prohibitive process, particularly where the OS image is large and would require a significant time and processing commitment from the components of the OS dependency management system 104.

Additional detail will now be discussed in connection with example visualization produced based on the generated plurality of transitive closures and based on features that are provided by a presentation tool (e.g., the presentation manager 114). For example, FIGS. 4A-4C illustrate example visualizations of a portion of a transitive closure graph in which binaries of the transitive closure graph as well as dependencies between the binaries are visualized. It will be noted that the examples shown in FIGS. 4A-4C are provided by way of example and have been simplified for the sake of explanation. Nevertheless, it will be understood that the visualizations of the transitive closures can include any number of interconnected icons representative of a significant number of binaries and dependencies as may serve a particular embodiment.

A shown in FIG. 4A, a first example visualization 402a of a set of binary icons 404-410 and associated binary dependencies are shown. The first example visualization 402a is generated by the OS dependency management system 104 (e.g., the presentation manager 114 on the OS dependency management system 104) based on a DGML file that is generated and provided to a visualization tool. In this example, a set of binary icons 404-410 are presented including a first binary icon 404, a second binary icon 406, a third binary icon 408, and a fourth binary icon 410. Each of the binary icons 404-410 are associated with a corresponding binary or external binary that is listed or otherwise included with a transitive closure graph generated by the OS dependency management system 104.

In the illustrated example, one or more embodiments of the icons include an identified of corresponding binaries as well as any number of identifiers indicating APIs that the binary is configured to use or call when hosted. In this particular example, the first binary refers to a binary of interest called "activeds.dll". As shown in this example, the first binary includes five APIs, which refer to any APIs that can be called by the first binary when executed on the framework of the OS. While second, third, and fourth binaries corresponding to the second binary icon 406, third binary icon 408, and fourth binary icon 410 do not show associated APIs, other example visualizations may be expanded to show APIs of multiple binaries.

As noted above, the first example visualization 402a includes an interactive presentation that enables a user to navigate or otherwise traverse icons of the transitive closure graph. For instance, in this example, the first binary icon 404 can be expanded to show the APIs based on a selection of a user of the first binary icon 404. Conversely, a user may select an already expanded icon to collapse the view and show the binary icon(s) without the associated APIs.

In addition to showing dependencies between binaries (e.g., as shown in FIG. 4A), one or more embodiments of the OS dependency management system 104 provides a view of dependencies between the binaries and APIs of other binaries. For example, FIG. 4B illustrates a second example visualization 402b showing dependencies between two of the respective binaries. In particular, as shown in FIG. 4B, the OS dependency management system 104 provides a visual indication of dependencies between the third binary and the first binary based on a selection of the third binary icon 408. More specifically, the presentation of the transitive closure graph shows dependencies between the third binary and specific APIs of the first binary.

In addition to showing dependencies between binaries and APIs of additional binaries, one or more embodiments of the OS dependency management system 104 additionally enables a visualization of dependencies between APIs of respective binaries. For example, FIG. 4C illustrates a third example visualization 402c showing dependencies between APIs of a first binary and APIs of a second binary. In this example, the OS dependency management system 104 provides the visualization of the dependencies between specific APIs based on a selection of the second binary icon 406. It will be appreciated that the dependencies between the second binary and the first binary refer to different APIs than the dependencies between the third binary and the first binary. Nevertheless, one or more embodiments involve a single API from the first binary having dependencies in common between any number of additional binaries.

While FIGS. 4A-4C show example visualizations in which dependences are viewed by traversing the transitive closure graph, other implementations provide other types of indicates. For example, in one or more embodiments, one or more APIs and/or binaries are highlighted or otherwise visually indicated as having a weak connection within the framework of the transitive closure tree. For instance, one or more APIs are strongly connected with multiple binaries while another API is connected with a single API of another binary, indicating a potentially weakly connected dependency. Other indicators may be provided that indicate other characteristics within the framework of the transitive closure graph.

Figure 5A:
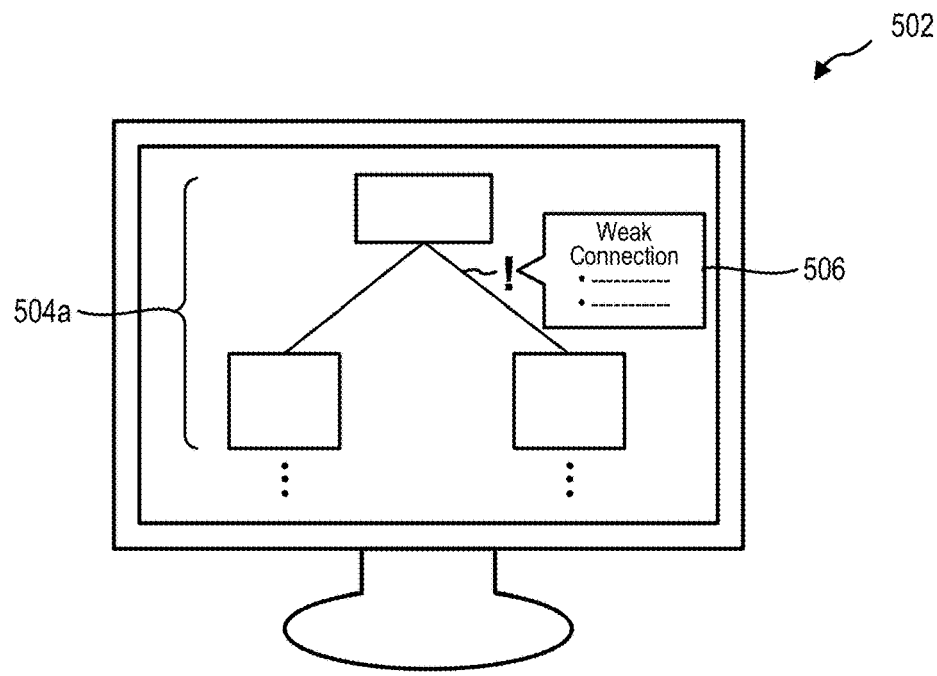
FIG. 5A-5B illustrate examples of dependency issues that can be identified and presented in accordance with one or more embodiments.
Figure 5B:
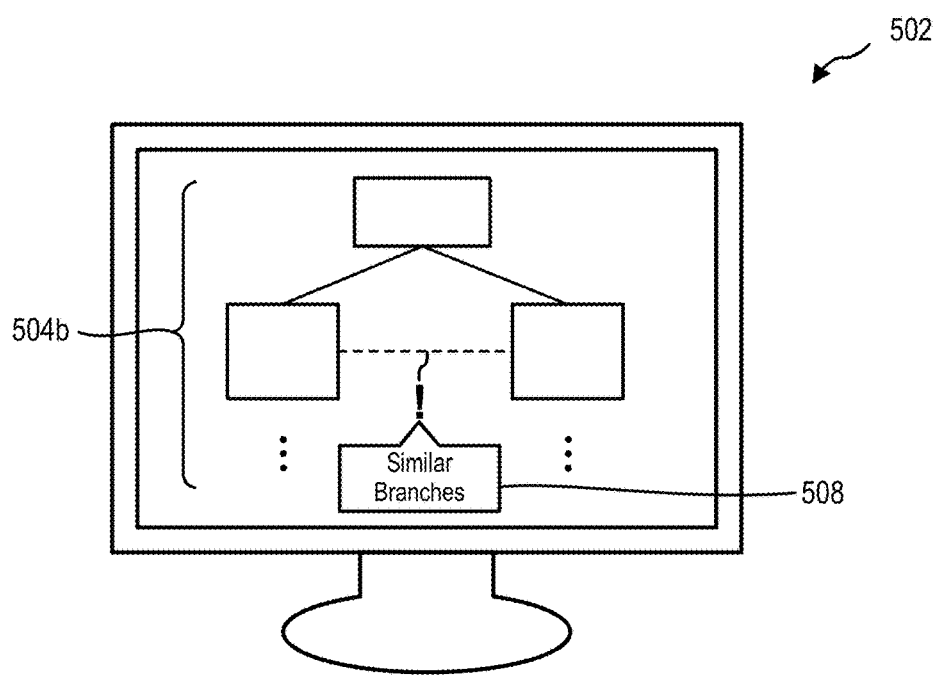

FIGS. 5A-5C illustrate examples of some of these indicators that provide insight about various characteristics about specific binaries, APIs, and dependencies within the transitive closure graph. These indicators of characteristics may be determined and provided based on analysis of the listing of dependencies and based on information obtained when generating the transitive closure graph.

As an example, FIG. 5A illustrates a presentation of a portion of a transitive closure graph on a graphical user interface of a client device 502. In this example, the presentation shows a set of binary icons 504a associated with binaries that are dependent on one another with first and second dependencies being displayed thereon. In this example, one of the dependencies is accompanied by a weak indicator icon 506 showing a possible weak connection or branch within the transitive closure graph. In determining or otherwise triggering a display of this weak indicator icon 506, the OS dependency management system 104 considers various weakness criteria.

For example, the OS dependency management system 104 determines a weak connection based on a determination that one or more binaries (e.g., a threshold number of binaries) are connected with another one or more binaries (e.g., another portion of the transitive closure graph) via a single dependency or single API (or other minimum threshold number of APIs). In one or more embodiments, a user clicks on the weakness icon 506 to view additional information about the flagged dependency or to expand a display of the graph in that particular region of the transitive closure graph to view the transitive closures and further examine why the dependency is weakly connected. In some cases, a user determines that the dependency can be modified or eliminated from the list of binaries that are added to the OS, further optimizing a resulting OS that can host the set of binaries.

FIG. 5B illustrates another example presentation showing another type of indication that is presented in connection with the display of binary icons. In this example, the presentation includes a second set of binary icons 504b associated with binaries that are dependent on one another with associated dependencies being displayed on the graphical user interface of the client device 502. In this illustrated example, the OS dependency management system 104 determines that two or more of the branches of the transitive closure graph satisfy a similarity criteria related to one another. For example, the OS dependency management system 104 determines that a first branch and a second branch of the transitive closure graph have similar or identical sets of APIs and/or sets of dependencies.

Upon determining the similarity of the two (or more) branches, the OS dependency management system 104 presents a similarity icon 508 to show that the two branches are similar to one another. Similar to FIG. 5A, the similarity icon 508 is an interactive icon that, when selected, causes a display of additional information to be presented. This feature enables a user to view additional information about the binaries or branches, such as viewing additional portions of the transitive closure graph or viewing similar binaries and/or branches side-by-side to determine whether the branches of binaries are sufficiently similar to a point that redundant branches can be removed from the transitive closure graph.

In one or more embodiments, these presentations enable a user to modify the listing of binaries that are included within the transitive graph object. For example, in one or more embodiments, the OS dependency management system 104 enables a user to modify a weak dependency (or binaries affected by the weak dependency) by removing certain branches or modifying the transitive closure graph in an effort to reduce a weakness of the dependencies. As another example, the OS dependency management system 104 enables a user to modify a set of branches that are redundant, such as eliminating redundant branches or making other modifications to reduce redundancies and further optimize hosting by the OS.

These modifications result in a modified listing of binaries that are added to an OS. This provides additional features related to modifying the OS based on the ability to traverse the transitive closure graph and view more specific details about the binaries. Indeed, the combination of tools provided by the OS dependency management system 104 enable automatic removal of a significant number of binaries and/or APIs that are unnecessary for hosting a particular program or set of binaries. The OS dependency management system 104 additionally enables a user to traverse a presentation of the transitive closure graph to view additional inefficiencies and further optimize a resulting OS. In each of these examples, the resulting output binaries are tested to ensure that the OS can effectively host the input binaries and operate as designed.

Figure 6:
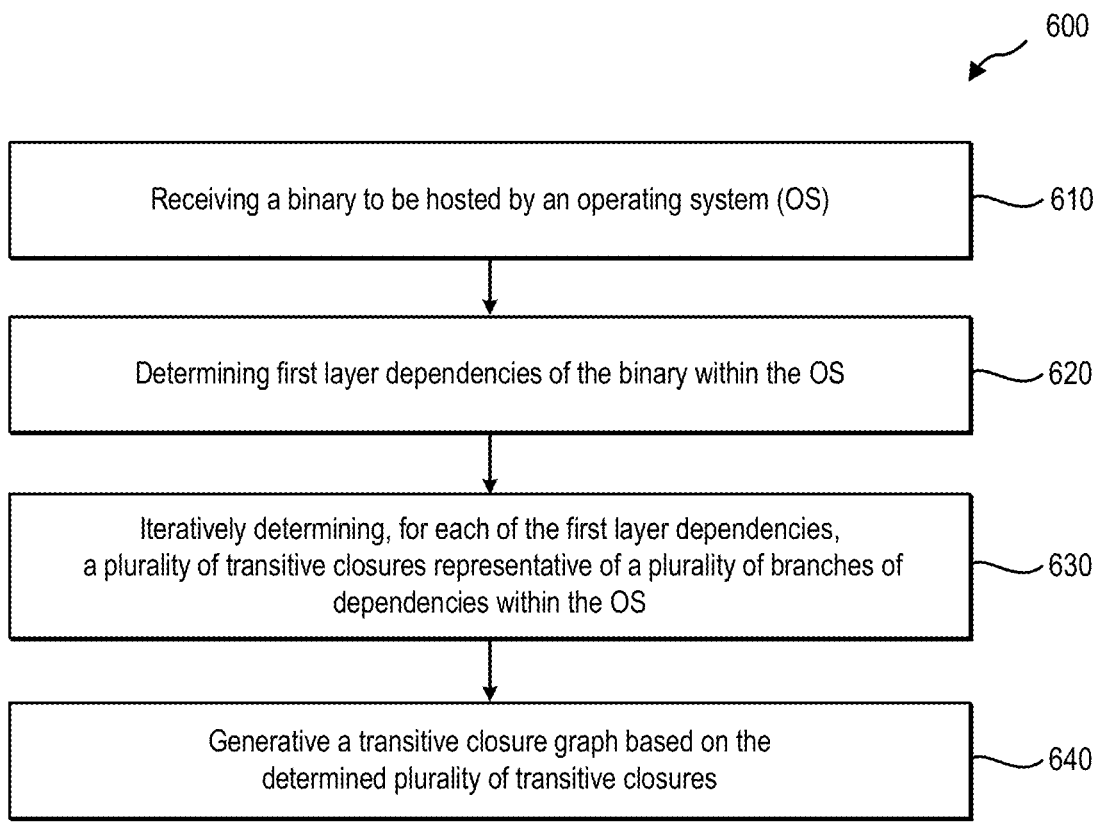
FIG. 6 illustrates an example series of acts for generating a transitive closure graph based on transitive closures that are generated for a binary in accordance with one or more embodiments.
Figure 7:
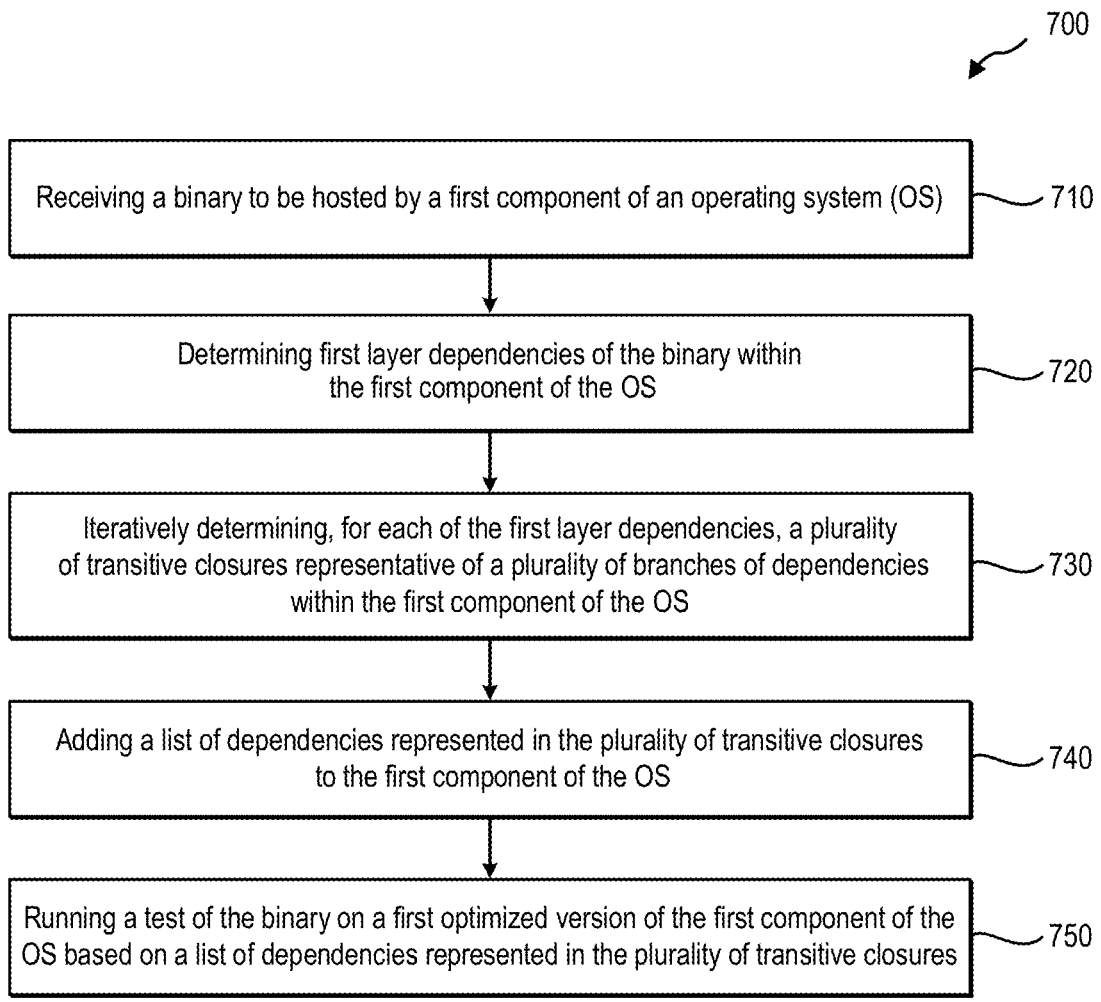
FIG. 7 illustrates an example series of acts for generating and testing an optimized version of a component of an operating system in accordance with one or more embodiments.

Turning now to FIGS. 6-7, these figures illustrates example flowcharts including a series of acts for analyzing binaries, determining dependencies that are needed for hosting the binaries, presenting the determined dependencies, and optimizing an operating system using the determined dependencies. While FIGS. 6-7 illustrates acts according to one or more embodiments, alternative embodiments may omit, add to, reorder, and/or modify any of the acts shown in FIGS. 6-7. The acts of FIGS. 6-7 can be performed as part of a method. Alternatively, a non-transitory computer-readable medium can include instructions that, when executed by one or more processors, cause a computing device (e.g., a server device) to perform the acts of FIGS. 6-7. In still further embodiments, a system can perform the acts of FIGS. 6-7.

FIG. 6 illustrates a series of acts 600 for analyzing binaries and generating a transitive closure graph reflective of dependencies of the binaries within an OS. As shown in FIG. 6, the series of acts 600 includes an act 610 of receiving a binary to be hosted by an operating system (OS). In one or more embodiments, the binary includes a set of codes to be hosted by one or more components of the OS.

As further shown, the series of acts 600 includes an act 620 of determining first layer dependencies of the binary within the OS. In one or more implementations, the act 620 includes determining a plurality of first layer dependencies of the binary within the OS by applying a binary analyzer tool to the binary.

As further shown, the series of acts 600 includes an act 630 of iteratively determining, for each of the first layer dependencies, a plurality of transitive closures representative of a plurality of branches of dependencies within the OS. In one or more embodiments, the act 630 includes determining a plurality of transitive closures representative of branches of dependencies within the OS. Determining the plurality of transitive closures may include iteratively determining, for each first layer dependency of the plurality of first layer dependencies, one or more transitive closures of the plurality of transitive closures.

As further shown, the series of acts 600 includes an act 640 of generating a transitive closure graph based on the determined plurality of transitive closures. In one or more embodiments, the act 640 includes generating a transitive closure graph based on the determined plurality of transitive closures where the transitive closure graph includes a tree of binaries represented within the plurality of transitive closures.

In one or more embodiments, determining the plurality of first layer dependencies includes pruning a list of external binaries output by the binary analyzer tool to identify a subset of external binaries that are needed when hosting the binary. In one or more embodiments, pruning the list of external binaries includes removing one or more invalid dependencies associated with external binaries that are unhosted by the OS.

In one or more embodiments, determining the plurality of transitive closures includes iteratively applying an OS composition database tool to each first layer dependency from the plurality of first layer dependencies. The OS composition database tool is configured to walk through each path of dependencies depending from a given first layer dependency until all possible paths of dependencies are determined for the given first layer dependency.

In one or more embodiments, the series of acts 600 includes hosting the binary on an optimized version of the OS in which at least one binary of the OS has been removed based on the at least one binary not being included within the plurality of transitive closures.

In one or more embodiments, generating the transitive closure graph includes generating directed graph markup language (DGML) object including the tree of binaries represented therein. In one or more implementations, the series of acts 600 includes providing a presentation of the transitive closure graph via a graphical user interface where providing the presentation includes providing a display of a plurality of icons associated with binaries represented within the plurality of transitive closures. In one or more implementations, providing the presentation includes providing a display of dependencies represented as edges connecting at least one application programming interface (API) from a first binary to one or more APIs of a second binary.

In one or more implementations, the series of acts 600 includes analyzing the branches of dependencies from the plurality of transitive closures to determine at least one branch from the branches of dependencies that satisfies a weakness criteria related to a minimum threshold number of dependencies connecting different portions of the transitive closure graph. In one or more implementations, the series of acts includes analyzing the branches of dependencies from the plurality of transitive closures to determine two or more branches of the plurality of branches that satisfy a similarity criteria related to a threshold similarity of binaries and dependencies between respective branches of the two or more branches.

FIG. 7 illustrates another series of acts 700 related to analyzing binaries, generating a transitive closure graph reflective of dependencies of the binaries within an OS, and testing an OS including a listing of binaries and dependencies identified within the transitive closure graph. As shown in FIG. 7, the series of acts 700 includes an act 710 of receiving a binary to be hosted by a first component of an operating system (OS).

As further shown, the series of acts 700 includes an act 720 of determining first layer dependencies of the binary within the component of the OS. In one or more embodiments, the act 720 includes determining a plurality of first layer dependencies of the binary within the first component of the OS by applying a binary analyzer tool to the binary.

As further shown, the series of acts 700 includes an act 730 of iteratively determining, for each of the first layer dependencies, a plurality of transitive closures representative of a plurality of branches of dependencies within the first component of the OS. In one or more embodiments, the act 730 includes determining a plurality of transitive closures representative of branches of dependencies within the first component of the OS where determining the plurality of transitive closures includes iteratively determining, for each first layer dependency of the plurality of first layer dependencies, one or more transitive closures of the plurality of transitive closures.

As further shown, the series of acts 700 includes an act 740 of adding a list of dependencies represented in the plurality of transitive closures to the first component of the OS. As further shown, the series of acts 700 includes an act 750 of running a test of the binary on a first optimized version of the first component of the OS based on a list of dependencies represented in the plurality of transitive closures. In one or more implementations, the act 750 includes running a test of the binary on a first optimized version of the first component of the OS in which at least one dependency of the first component of the operating system has been removed based on the at least one dependency not being included within the plurality of transitive closures.

In one or more embodiments, determining the plurality of first layer dependencies includes pruning a list of external binaries output by the binary analyzer tool to identify a subset of external binaries that are needed when hosting the binary. In one or more embodiments, pruning the list of external binaries includes removing one or more invalid dependencies associated with external binaries that are unhosted by the first component of the OS.

In one or more embodiments, the series of acts 700 includes analyzing the branches of dependencies from the plurality of transitive closures to determine at least one branch from the branches of dependencies that satisfies a weakness criteria related to a minimum threshold number of dependencies connecting different portions of the transitive closure graph. In one or more embodiments, the series of acts 700 includes analyzing the branches of dependencies from the plurality of transitive closures to determine two or more branches of the plurality of branches that satisfy a similarity criteria related to a threshold similarity of binaries and dependencies between respective branches of the two or more branches.

Figure 8:
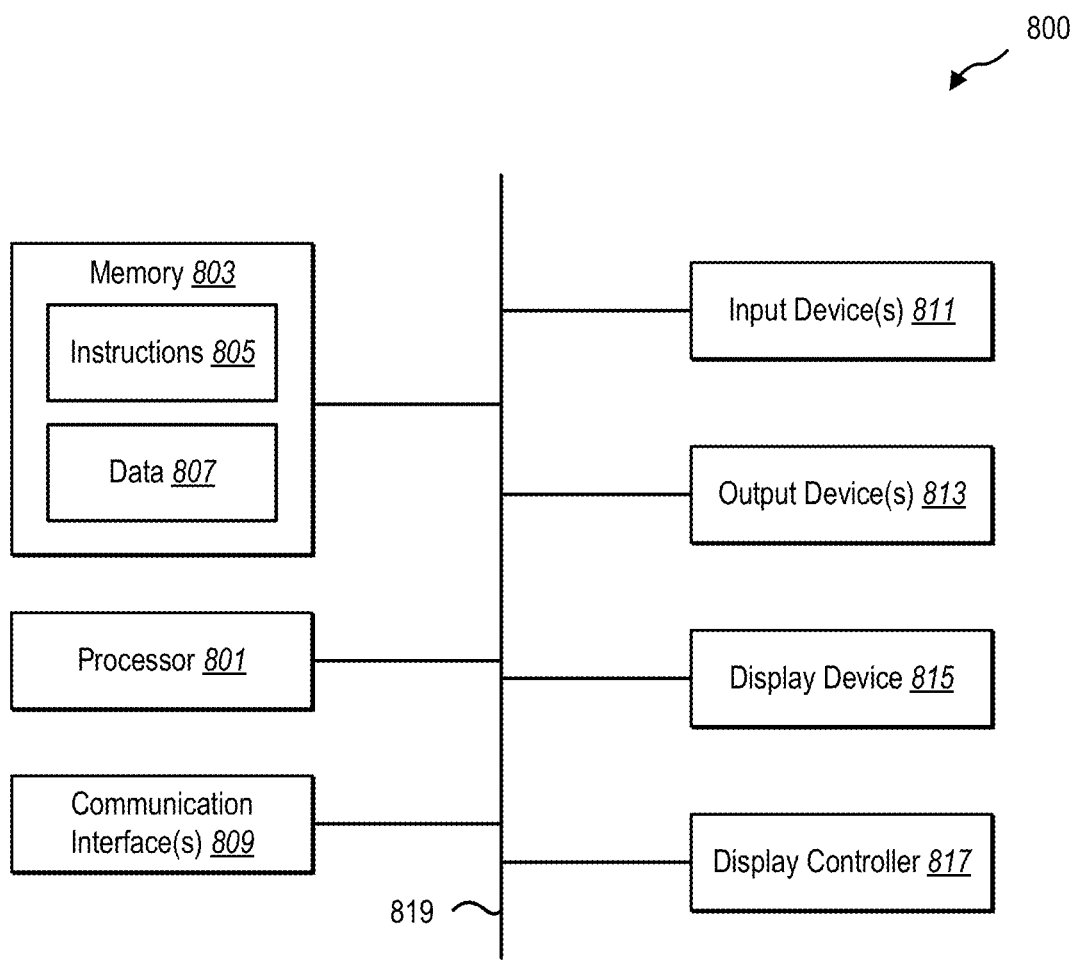
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that may be included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

As used herein, in an example, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a binary to be hosted by an operating system (OS);
   determining a plurality of first layer dependencies of the binary within the OS by applying a binary analyzer tool to the binary;
   determining a plurality of transitive closures representative of branches of dependencies within the OS, wherein determining the plurality of transitive closures includes iteratively determining, for each first layer dependency of the plurality of first layer dependencies, one or more transitive closures of the plurality of transitive closures; and
   hosting the binary on an optimized version of the OS in which at least one binary of the OS has been removed based on the at least one binary not being included within the plurality of transitive closures.

2. The method of claim 1, wherein determining the plurality of first layer dependencies includes pruning a list of external binaries output by the binary analyzer tool to identify a subset of external binaries that are needed when hosting the binary.

3. The method of claim 2, wherein pruning the list of external binaries includes removing one or more invalid dependencies associated with external binaries that are unhosted by the OS.

4. The method of claim 1, wherein the binary includes a set of codes to be hosted by one or more components of the OS.

5. The method of claim 1, wherein determining the plurality of transitive closures includes iteratively applying an OS composition database tool to each first layer dependency from the plurality of first layer dependencies, the OS composition database tool being configured to walk through each path of dependencies depending from a given first layer dependency until all possible paths of dependencies are determined for the given first layer dependency.

6. The method of claim 1, further comprising generating a transitive closure graph based on the determined plurality of transitive closures, the transitive closure graph including a tree of binaries represented within the plurality of transitive closures.

7. The method of claim 6, wherein generating the transitive closure graph includes generating a directed graph markup language (DGML) object including the tree of binaries represented therein.

8. The method of claim 7, further comprising providing a presentation of the transitive closure graph via a graphical user interface, wherein providing the presentation includes providing a display of a plurality of icons associated with binaries represented within the plurality of transitive closures.

9. The method of claim 8, wherein providing the presentation further includes providing a display of dependencies represented as edges connecting at least one application programming interface (API) from a first binary to one or more APIs of a second binary.

10. The method of claim 1, further comprising analyzing the branches of dependencies from the plurality of transitive closures to determine at least one branch from the branches of dependencies that satisfies a weakness criteria related to a minimum threshold number of dependencies connecting different portions of the transitive closure graph.

11. The method of claim 1, further comprising analyzing the branches of dependencies from the plurality of transitive closures to determine two or more branches of the plurality of branches that satisfy a similarity criteria related to a threshold similarity of binaries and dependencies between respective branches of the two or more branches.

12. A method, comprising:
    receiving a binary to be hosted by a first component of an operating system (OS);
    determining a plurality of first layer dependencies of the binary within the first component of the OS by applying a binary analyzer tool to the binary;
    determining a plurality of transitive closures representative of branches of dependencies within the first component of the OS, wherein determining the plurality of transitive closures includes iteratively determining, for each first layer dependency of the plurality of first layer dependencies, one or more transitive closures of the plurality of transitive closures;
    adding a list of dependencies represented in the plurality of transitive closures to the first component of the OS; and
    running a test of the binary on a first optimized version of the first component of the OS in which at least one dependency of the first component of the operating system has been removed based on the at least one dependency not being included within the plurality of transitive closures.

13. The method of claim 12, wherein determining the plurality of first layer dependencies includes pruning a list of external binaries output by the binary analyzer tool to identify a subset of external binaries that are needed when hosting the binary.

14. The method of claim 13, wherein pruning the list of external binaries includes removing one or more invalid dependencies associated with external binaries that are unhosted by the first component of the OS.

15. The method of claim 12, wherein determining the plurality of transitive closures includes iteratively applying an OS composition database tool to each first layer dependency from the plurality of first layer dependencies, the OS composition database tool being configured to walk through each path of dependencies depending from a given first layer dependency until all possible paths of dependencies are determined for the given first layer dependency.

16. The method of claim 12, further comprising analyzing the branches of dependencies from the plurality of transitive closures to determine at least one branch from the branches of dependencies that satisfies a weakness criteria related to a minimum threshold number of dependencies connecting different portions of the transitive closure graph.

17. The method of claim 12, further comprising analyzing the branches of dependencies from the plurality of transitive closures to determine two or more branches of the plurality of branches that satisfy a similarity criteria related to a threshold similarity of binaries and dependencies between respective branches of the two or more branches.

18. A system, comprising:
    at least one processor;
    memory in electronic communication with the at least one processor; and
    instructions stored in the memory, the instructions being executable by the at least one processor to:
    receive a binary to be hosted by an operating system (OS);
    determine a plurality of first layer dependencies of the binary within the OS by applying a binary analyzer tool to the binary;

determine a plurality of transitive closures representative of branches of dependencies within the OS, wherein determining the plurality of transitive closures includes iteratively determining, for each first layer dependency of the plurality of first layer dependencies, one or more transitive closures of the plurality of transitive closures; and host the binary on an optimized version of the OS in which at least one binary of the OS has been removed based on the at least one binary not being included include within the plurality of transitive closures.

19. The system of claim 18, wherein determining the plurality of first layer dependencies includes pruning a list of external binaries output by the binary analyzer tool to identify a subset of external binaries that are needed when hosting the binary, and wherein pruning the list of external binaries includes removing one or more invalid dependencies associated with external binaries that are unhosted by the OS.

20. The system of claim 18, wherein the instructions are further executable by the at least one processor to generate a transitive closure graph based on the determined plurality of transitive closures, the transitive closure graph including a tree of binaries represented within the plurality of transitive closures.

* * * * *